US012158072B1

(12) United States Patent
Sippel et al.

(10) Patent No.: US 12,158,072 B1
(45) Date of Patent: Dec. 3, 2024

(54) TURBINE SHROUD SEGMENTS WITH DAMPING STRIP SEALS

(71) Applicant: Rolls-Royce Corporation, Indianapolis, IN (US)

(72) Inventors: Aaron D. Sippel, Indianapolis, IN (US); David J. Thomas, Indianapolis, IN (US); Ted J. Freeman, Indianapolis, IN (US); Clark Snyder, Indianapolis, IN (US); Grant Cook, Indianapolis, IN (US); Jeffrey A. Stone, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 18/528,724

(22) Filed: Dec. 4, 2023

(51) Int. Cl.
*F01D 11/08* (2006.01)

(52) U.S. Cl.
CPC .......... *F01D 11/08* (2013.01); *F05D 2220/32* (2013.01); *F05D 2230/60* (2013.01); *F05D 2240/55* (2013.01)

(58) Field of Classification Search
CPC ........ F01D 11/00; F01D 11/005; F01D 11/08; F01D 11/12; F01D 11/122; F05D 2240/11; F05D 2240/55; F05D 2230/60; F05D 2220/32
See application file for complete search history.

(56) References Cited

U.S. PATENT DOCUMENTS

| | | | | |
|---|---|---|---|---|
| 5,738,490 | A * | 4/1998 | Pizzi | F01D 11/08 415/173.1 |
| 7,207,771 | B2 | 4/2007 | Synnott et al. | |
| 7,217,089 | B2 | 5/2007 | Durocher et al. | |
| 7,374,395 | B2 | 5/2008 | Durocher et al. | |
| 7,513,740 | B1 | 4/2009 | Hervy et al. | |
| 7,600,967 | B2 | 10/2009 | Pezzetti, Jr. et al. | |
| 7,771,159 | B2 | 8/2010 | Johnson et al. | |
| 7,901,186 | B2 | 3/2011 | Cornett et al. | |
| 8,206,087 | B2 | 6/2012 | Campbell et al. | |
| 8,303,245 | B2 | 11/2012 | Foster et al. | |
| 8,641,371 | B2 | 2/2014 | Nakamura et al. | |
| 8,651,497 | B2 | 2/2014 | Tholen et al. | |
| 8,684,680 | B2 | 4/2014 | Martin et al. | |
| 8,784,041 | B2 | 7/2014 | Durocher et al. | |
| 8,845,285 | B2 | 9/2014 | Weber et al. | |
| 8,905,708 | B2 | 12/2014 | Weber et al. | |
| 9,079,245 | B2 | 7/2015 | Durocher et al. | |

(Continued)

FOREIGN PATENT DOCUMENTS

| | | | |
|---|---|---|---|
| EP | 1965031 | A2 | 9/2008 |
| EP | 3543468 | A1 | 9/2019 |
| FR | 3056636 | A1 | 3/2018 |

*Primary Examiner* — Elton K Wong

(74) *Attorney, Agent, or Firm* — Barnes & Thornburg LLP

(57) ABSTRACT

A turbine shroud assembly includes a first shroud segment, a second shroud segment, and a damping strip seal. The first shroud segment has a first carrier segment arranged circumferentially at least partway around a central axis and a first blade track segment supported by the first carrier segment. The second shroud segment is arranged circumferentially adjacent the first shroud segment about the central axis. The damping strip seal extends circumferentially into the first shroud segment and the second shroud segment to block gases from passing between the first shroud segment and the second shroud segment.

20 Claims, 8 Drawing Sheets

(56) References Cited

U.S. PATENT DOCUMENTS 9,534,500 B2 1/2017 Bouchard et al.
9,708,922 B1 7/2017 Davis et al.
9,714,580 B2 7/2017 Slavens et al.
9,745,854 B2 8/2017 Baldiga et al.
9,759,079 B2 9/2017 Sippel et al.
9,863,265 B2 1/2018 Stapleton
9,863,323 B2 1/2018 Kirtley et al.
9,869,201 B2 1/2018 Dyson et al.
9,874,104 B2 1/2018 Shapiro
9,915,162 B2 3/2018 Duguay
9,945,484 B2 4/2018 Moehrle et al.
9,957,827 B2 5/2018 Davis et al.
9,982,550 B2 5/2018 Davis
9,988,919 B2 6/2018 Davis et al.
9,988,923 B2 6/2018 Snyder et al.
10,012,099 B2 7/2018 Cetel et al.
10,024,193 B2 7/2018 Shapiro
10,072,517 B2 9/2018 Boeke et al.
10,082,085 B2 9/2018 Thomas et al.
10,087,771 B2 10/2018 Mcgarrah
10,100,660 B2 10/2018 Sippel et al.
10,132,197 B2 11/2018 Heitman et al.
10,138,747 B2 11/2018 Dev et al.
10,138,750 B2 11/2018 Mccaffrey et al.
10,167,957 B2 1/2019 Davis et al.
10,202,863 B2 2/2019 Davis et al.
10,265,806 B2 4/2019 Cui et al.
10,281,045 B2 5/2019 Sippel et al.
10,301,955 B2 5/2019 Vetters et al.
10,301,960 B2 5/2019 Stapleton et al.
10,378,385 B2 8/2019 Tesson et al.
10,378,386 B2 8/2019 Roussille et al.
10,415,426 B2 9/2019 Quennehen et al.
10,415,427 B2 9/2019 Quennehen et al.
10,422,241 B2 9/2019 Mccaffrey et al.
10,428,688 B2 10/2019 Quennehen et al.
10,428,953 B2 10/2019 Lutjen et al.
10,443,419 B2 10/2019 Thomas et al.
10,443,420 B2 10/2019 Sippel et al.
10,465,545 B2 11/2019 Cetel et al.
10,533,446 B2 1/2020 Barak et al.
10,550,706 B2 2/2020 Lutjen et al.
10,577,963 B2 3/2020 Mccaffrey
10,577,977 B2 3/2020 Baucco
10,584,605 B2 3/2020 Sippel et al.
10,590,803 B2 3/2020 Quennehen et al.
10,598,045 B2 3/2020 Tableau et al.
10,605,120 B2 3/2020 Quennehen et al.
10,619,517 B2 4/2020 Quennehen et al.
10,626,745 B2 4/2020 Roussille et al.
10,633,994 B2 4/2020 Barker
10,648,362 B2 5/2020 Groves, II et al.
10,655,495 B2 5/2020 Groves, II et al.
10,655,501 B2 5/2020 Lepretre et al.
10,662,794 B2 5/2020 Das
10,689,998 B2 6/2020 Stapleton et al.
10,690,007 B2 6/2020 Quennehen et al.
10,704,404 B2 7/2020 Shi et al.
10,718,226 B2 7/2020 Vetters et al.
10,724,399 B2 7/2020 Carlin et al.
10,731,494 B2 8/2020 Dev et al.
10,731,509 B2 8/2020 Correia et al.
10,738,643 B2 8/2020 Mccaffrey et al.
10,753,221 B2 8/2020 Barker et al.
10,787,924 B2 9/2020 Quennehen et al.
10,794,204 B2 10/2020 Fitzpatrick et al.
10,801,345 B2 10/2020 Clum et al.
10,801,349 B2 10/2020 Mccaffrey
10,815,807 B2 10/2020 Vantassel et al.
10,815,810 B2 10/2020 Barker et al.
10,830,357 B2 11/2020 Mccaffrey et al.
10,890,079 B2 1/2021 Propheter-Hinckley et al.
10,907,487 B2 2/2021 Zurmehly et al.
10,907,501 B2 2/2021 Filippi et al.
10,934,872 B2 3/2021 Tableau et al.
10,934,873 B2 3/2021 Sarawate et al.
10,968,761 B2 4/2021 Barker et al.
10,968,777 B2 4/2021 Propheter-Hinckley et al.
10,982,559 B2 4/2021 Filippi
11,002,144 B2 5/2021 Azad et al.
11,015,613 B2 5/2021 Kerns et al.
11,021,988 B2 6/2021 Tableau et al.
11,021,990 B2 6/2021 Filippi
11,028,720 B2 6/2021 Tableau et al.
11,041,399 B2 6/2021 Lutjen et al.
11,047,245 B2 6/2021 Mccaffrey
11,066,947 B2 7/2021 Sippel et al.
11,073,045 B2 7/2021 Sippel et al.
11,078,804 B2 8/2021 Tableau et al.
11,085,316 B2 8/2021 Barker et al.
11,085,317 B2 8/2021 Johnson et al.
11,105,215 B2 8/2021 Roy Thill et al.
11,111,794 B2 9/2021 Bitzko et al.
11,111,802 B2 9/2021 Propheter-Hinckley et al.
11,111,822 B2 9/2021 Tableau et al.
11,111,823 B2 9/2021 Jarrossay et al.
11,125,096 B2 9/2021 Clark et al.
11,125,098 B2 9/2021 Barker et al.
11,143,050 B2 10/2021 Roy Thill et al.
11,149,574 B2 10/2021 Laroche
11,174,747 B2 11/2021 Roy Thill et al.
11,174,795 B2 11/2021 Lutjen et al.
11,181,006 B2 11/2021 Smoke et al.
11,187,094 B2 11/2021 Feldmann et al.
11,215,064 B2 1/2022 Arbona et al.
11,215,065 B2 1/2022 Starr et al.
11,215,081 B2 1/2022 Schilling et al.
11,248,480 B2 2/2022 Thirumalai et al.
11,255,208 B2 2/2022 Clark et al.
11,255,209 B2 2/2022 Clark et al.
11,286,812 B1 3/2022 Freeman et al.
11,313,242 B2 4/2022 Cetel et al.
11,319,827 B2 5/2022 Clark et al.
11,319,828 B1 5/2022 Freeman et al.
11,326,463 B2 5/2022 Blaney et al.
11,326,470 B2 5/2022 Dyson et al.
11,346,237 B1 5/2022 Freeman et al.
11,346,251 B1 5/2022 Freeman et al.
11,365,635 B2 6/2022 Read et al.
11,441,434 B2 9/2022 Danis et al.
11,441,441 B1 9/2022 Freeman et al.
11,466,585 B2 10/2022 Arbona et al.
11,466,586 B2 10/2022 Sippel et al.
11,499,444 B1 11/2022 Freeman et al.
11,506,085 B2 11/2022 Jarrossay et al.
11,542,825 B2 1/2023 Hauswirth et al.
11,542,827 B2 1/2023 Quennehen et al.
11,624,291 B2 4/2023 Roy Thill et al.
11,624,292 B2 4/2023 Clark et al.
11,629,607 B2 4/2023 Freeman et al.
11,643,939 B2 5/2023 Stoyanov et al.
11,702,948 B2 7/2023 Hock et al.
11,702,949 B2 7/2023 Freeman et al.
11,713,694 B1 8/2023 Freeman et al.
11,732,604 B1 8/2023 Freeman et al.
11,761,351 B2 9/2023 Freeman et al.
11,773,751 B1 10/2023 Freeman et al.
11,781,440 B2 10/2023 Vincent et al.
11,781,448 B1 10/2023 Holleran
11,840,930 B2 12/2023 Propheter-Hinckley et al.
11,840,936 B1 12/2023 Freeman et al.
11,879,349 B2 1/2024 Schilling et al.
2020/0141254 A1* 5/2020 Sarawate ................ F01D 11/08
2021/0071541 A1* 3/2021 Thirumalai .......... F16J 15/0887
2021/0131300 A1* 5/2021 Arbona ................. F01D 25/246
2023/0184124 A1 6/2023 Stoyanov et al.
2023/0332506 A1 10/2023 Freeman et al.
2024/0003267 A1 1/2024 Cazin et al.

* cited by examiner

TURBINE SHROUD SEGMENTS WITH DAMPING STRIP SEALS

FIELD OF THE DISCLOSURE

The present disclosure relates generally to turbine shroud segments, and more specifically to sealing turbine shroud segments used with gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds are made up of a number of segments arranged circumferentially adjacent to one another to form a ring. Such shrouds may include sealing elements between segments to block air from leaking through the segments during operation of the gas turbine engine.

SUMMARY

The present disclosure may comprise one or more of the following features and combinations thereof.

A turbine shroud assembly for use with a gas turbine engine may comprise a first shroud segment, a second shroud segment, and a damping strip seal. The first shroud segment may include a first carrier segment and a first blade track segment. The first carrier segment may be arranged circumferentially at least partway around a central axis. The first blade track segment may be supported by the first carrier segment to define a portion of a gas path of the turbine shroud assembly. The first carrier segment may have a first outer wall, a first flange, and a second flange. The first flange may extend radially inward from the first outer wall. The second flange may be axially spaced apart from the first flange and may extend radially inward from the first outer wall. The second shroud segment may be arranged circumferentially adjacent the first shroud segment about the central axis. The second shroud segment may include a second carrier segment and a second blade track segment. The second blade track segment may be supported by the second carrier segment to define another portion of the gas path of the turbine shroud assembly. The second carrier segment may have a second outer wall, a first flange, and a second flange. The first flange may extend radially inward from the second outer wall. The second flange may be axially spaced apart from the first flange of the second carrier segment and may extend radially inward from the second outer wall.

In some embodiments, the damping strip seal may extend circumferentially into the first shroud segment and the second shroud segment to block gases from passing radially between the first shroud segment and the second shroud segment. The damping strip seal may have a body segment, a first end portion, and a second end portion. The body segment may extend axially along a first radial outer surface of the first blade track segment and a second radial outer surface of the second blade track segment. The first end portion may extend along a first curvilinear path radially outward and axially aft from a first axial end of the body segment. The second end portion may extend along a second curvilinear path radially outward and axially forward from a second axial end of the body segment. The first end portion of the damping strip seal may engage the first flange of the first carrier segment and the second end portion of the damping strip seal may engage the second flange of the first carrier segment to urge the body segment of the damping strip seal radially inward against the first blade track segment and the second blade track segment to dampen flutter movement of the damping strip seal.

In some embodiments, the damping strip seal may be integrally formed as a single, one-piece component. The first flange of the first carrier segment may be formed to include a first seal-retaining recess that is defined by a first circumferentially-extending face, a second circumferentially-extending face located axially opposite the first circumferentially-extending face, and an axially-extending face that extends between and interconnects the first circumferentially-extending face and the second circumferentially-extending face. The first flange of the second carrier segment may be formed to include a second seal-retaining recess that is defined by a first circumferentially-extending face, a second circumferentially-extending face located axially opposite the first circumferentially-extending face, and an axially-extending face that extends between and interconnects the first circumferentially-extending face and the second circumferentially-extending face. A first height of the first seal-retaining recess may be less than a second height of the second seal-retaining recess. The first end portion of the damping strip seal may contact the axially-extending face of the first seal-retaining recess without contacting the axially-extending face of the second seal-retaining recess.

In some embodiments, the first flange of the second carrier segment may be formed to include a second seal-retaining recess that is defined by a first circumferentially-extending face, a second circumferentially-extending face located axially opposite the first circumferentially-extending face, and an axially-extending face that extends between and interconnects the first circumferentially-extending face and the second circumferentially-extending face. A first height of the first seal-retaining recess may be equal to a second height of the second seal-retaining recess. The first end portion of the damping strip seal may contact the axially-extending face of the first seal-retaining recess without contacting the axially-extending face of the second seal-retaining recess.

In some embodiments, the first blade track segment may include a first shroud wall and a first attachment feature. The first shroud wall may extend circumferentially partway around the central axis. The first attachment feature may extend radially outward from the first shroud wall. A circumferential end of the first shroud wall may be formed with a first recess to define a first shoulder that provides the first radial outer surface of the first blade track segment. The second blade track segment may include a second shroud wall that extends circumferentially partway around the central axis and a second attachment feature. The second attachment feature may extend radially outward from the second shroud wall. A circumferential end of the second shroud wall may be formed with a second recess to define a second shoulder that provides the second radial outer surface of the second blade track segment. The body segment of the damping strip seal may engage the first shoulder and the second shoulder.

In some embodiments, the first flange of the first carrier segment may include a first wall and a first protrusion that extends radially inward from the first wall to cover a first axial end of the first blade track segment. The first wall may be formed to include a radial inward facing surface and a first seal-retaining recess may extend radially outward into the first flange from the radially inward facing surface. The first carrier segment may include a third flange and a fourth flange. The third flange may extend radially inward from the first outer wall. The fourth flange may be axially spaced apart from the third flange and may extend radially inward from the first outer wall. The third flange may be located axially between the first flange and the fourth flange. The fourth flange may be located axially between the third flange and the second flange. The first blade track segment may include a first shroud wall, a first attachment flange, and a second attachment flange. The first shroud wall may extend circumferentially partway around the central axis. The first attachment flange may extend radially outward from the first shroud wall. The second attachment flange may be spaced apart axially aft from the first attachment flange and may extend radially outward from the first shroud wall.

In some embodiments, the first shroud segment may include a first retainer that extends through the first carrier segment and the first blade track segment so as to couple the first blade track segment to the first carrier segment. The second flange of the first carrier segment may be formed to include a third seal-retaining recess to receive the second end portion of the damping strip seal therein.

According to another aspect of the present disclosure, a turbine shroud assembly for use with a gas turbine engine may comprise a first shroud segment, a second shroud segment, and a damping strip seal. The first shroud segment may include a first carrier segment and a first blade track segment. The first carrier segment may be arranged circumferentially at least partway around a central axis. The first blade track segment may be supported by the first carrier segment to define a portion of a gas path of the turbine shroud assembly. The first carrier segment may have having an outer wall, a first flange, and a second flange. The first flange may extend radially inward from the outer wall. The second flange may be axially spaced apart from the first flange and may extend radially inward from the outer wall. The second shroud segment may include a second carrier segment arranged circumferentially at least partway around a central axis and a second blade track segment supported by the second carrier segment.

In some embodiments, the damping strip seal may have a body segment, a first end portion, and a second end portion. The body segment may engage a radial outer surface of the first blade track segment. A first end portion may extend radially outward from a first end of the body segment and may engage the first flange. A second end portion may extend radially outward from a second end of the body segment and may engage the second flange to urge the body segment radially inward toward the radial outer surface of the first blade track segment. The damping strip seal may be integrally formed as a single, one-piece component.

In some embodiments, the first end portion of the damping strip seal may be formed to include a radially-extending portion that extends radially outward from the first end of the body segment and an axially-extending portion that extends axially aft from the radially-extending portion to form a first curvilinear path. The second end portion of the damping strip seal may be formed to include a radially-extending portion that extends radially outward from the second end of the body segment and an axially-extending portion that extends axially forward from the radially-extending portion to form a second curvilinear path. The first flange may be formed to include a first seal-retaining recess that is defined by a first circumferentially-extending face, a second circumferentially-extending face located axially opposite the first circumferentially-extending face, and an axially-extending face that extends between and interconnects the first circumferentially-extending face and the second circumferentially-extending face. The axially-extending portion of the first end portion of the damping strip seal may contact the axially-extending face of the first seal-retaining recess.

In some embodiments, the body segment of the damping strip seal may have a first width. At least a portion of the first end portion may have a second width. The first width of the body segment may be greater than the second width of the at least a portion of the first end portion. The body segment of the damping strip seal may have a first width. The first end portion may have a second width. The first width of the body segment may be substantially similar to the second width of the first end portion.

In some embodiments, the first blade track segment may include a shroud wall that extends circumferentially partway around the central axis and an attachment feature that extends radially outward from the shroud wall. A circumferential end of the shroud wall may be formed with a recess to define a shoulder that provides the radial outer surface of the first blade track segment. The body segment of the damping strip seal may engage the shoulder. The first carrier segment may include a third flange that extends radially inward from the outer wall and a fourth flange axially spaced apart from the third flange and extending radially inward from the outer wall. The third flange may be located axially between the first flange and the fourth flange. The fourth flange may be located axially between the third flange and the second flange. The first blade track segment may include a shroud wall, a first attachment flange, and a second attachment flange. The shroud wall may extend circumferentially partway around the central axis. The first attachment flange may extend radially outward from the shroud wall. The second attachment flange may be spaced apart axially aft from the first attachment flange that extends radially from the shroud wall. The first shroud segment may further include a first retainer that extends through the first carrier segment and the first blade track segment so as to couple the first blade track segment to the first carrier segment.

A method of assembling a turbine shroud assembly for use with a gas turbine engine may comprise assembling a first shroud segment by moving a first blade track segment into engagement with a first carrier segment and inserting a first retainer through the first blade track segment and the first carrier segment to couple the first blade track segment to the first carrier segment. The method may include assembling a second shroud segment by moving a second blade track segment into engagement with a second carrier segment and inserting a second retainer through the second blade track segment and the second carrier segment to couple the second blade track segment to the second carrier segment. The method may include providing a damping strip seal that includes a body segment, a first end portion extending radially outward from a first end of the body segment, and a second end portion extending radially outward from a second end of the body segment.

In some embodiments, the method may include sliding the body segment of the damping strip seal onto a first radial outer surface of the first blade track segment so that the first end portion of the damping strip seal engages a first flange of the first carrier segment and the second end portion of the damping strip seal engages a second flange of the first carrier segment. The method may include moving the second shroud segment toward the first shroud segment so that the second shroud segment is arranged circumferentially adjacent the first shroud segment and the body segment of the damping strip seal extends circumferentially between and axially along the first blade track segment and the second blade track segment.

In some embodiments, the method may include including locating the first end portion of the damping strip seal in a first seal-retaining recess formed in the first flange of the first carrier segment and in a third seal-retaining recess formed in a first flange of the second carrier segment and locating the second end portion of the damping strip seal in a second seal-retaining recess formed in the second flange of the first carrier segment and a fourth seal-retaining recess formed in a second flange of the second carrier segment. The method may include urging the body segment of the damping strip seal radially inward against the first blade track segment and the second blade track segment through engagement of the first end portion of the damping strip seal with the first seal-retaining recess and the second end portion of the damping strip seal with the second seal-retaining recess.

These and other features of the present disclosure will become more apparent from the following description of the illustrative embodiments.

DETAILED DESCRIPTION

Figure 1:
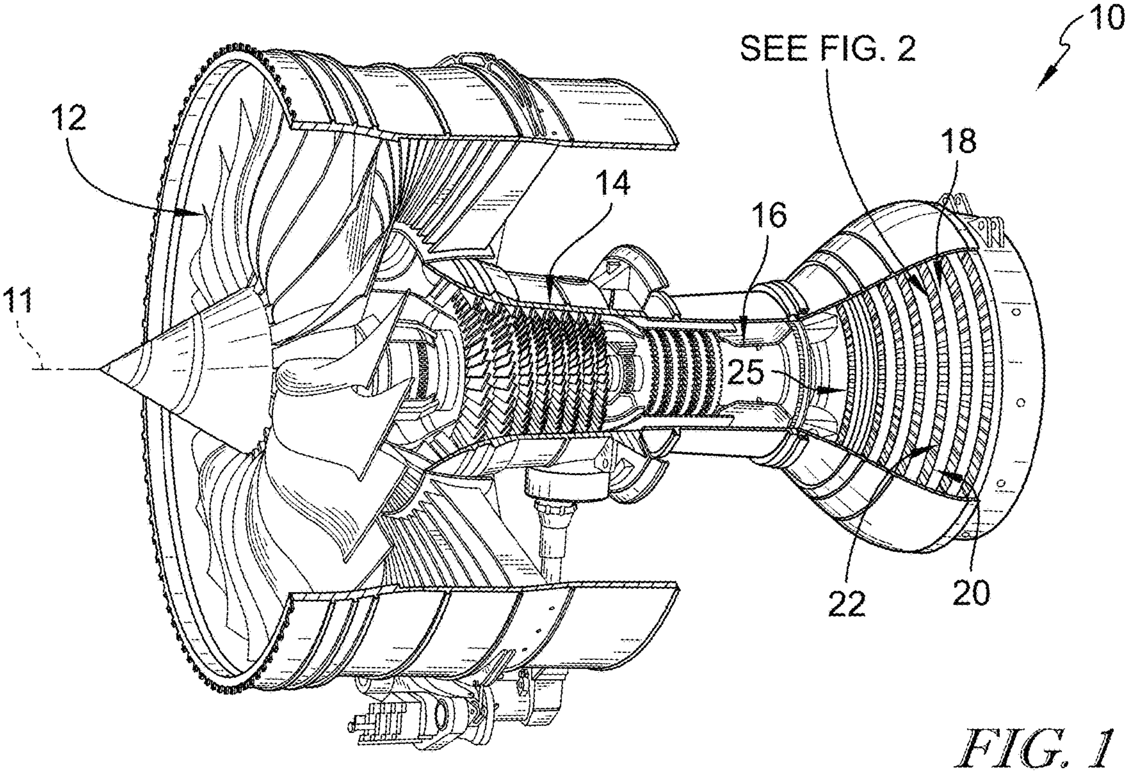
FIG. 1 is a cutaway perspective view of a gas turbine engine that includes a fan, a compressor, a combustor, and a turbine, the turbine including a turbine shroud assembly that extends circumferentially around an axis of the gas turbine engine and turbine wheel assemblies that are driven to rotate about the axis to generate power.

For the purposes of promoting an understanding of the principles of the disclosure, reference will now be made to a number of illustrative embodiments illustrated in the drawings and specific language will be used to describe the same.

An illustrative aerospace gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis 11 and drive the compressor 14 and the fan 12. In some embodiments, the fan 12 may be replaced with a propeller, drive shaft, or other suitable configuration.

Figure 2:
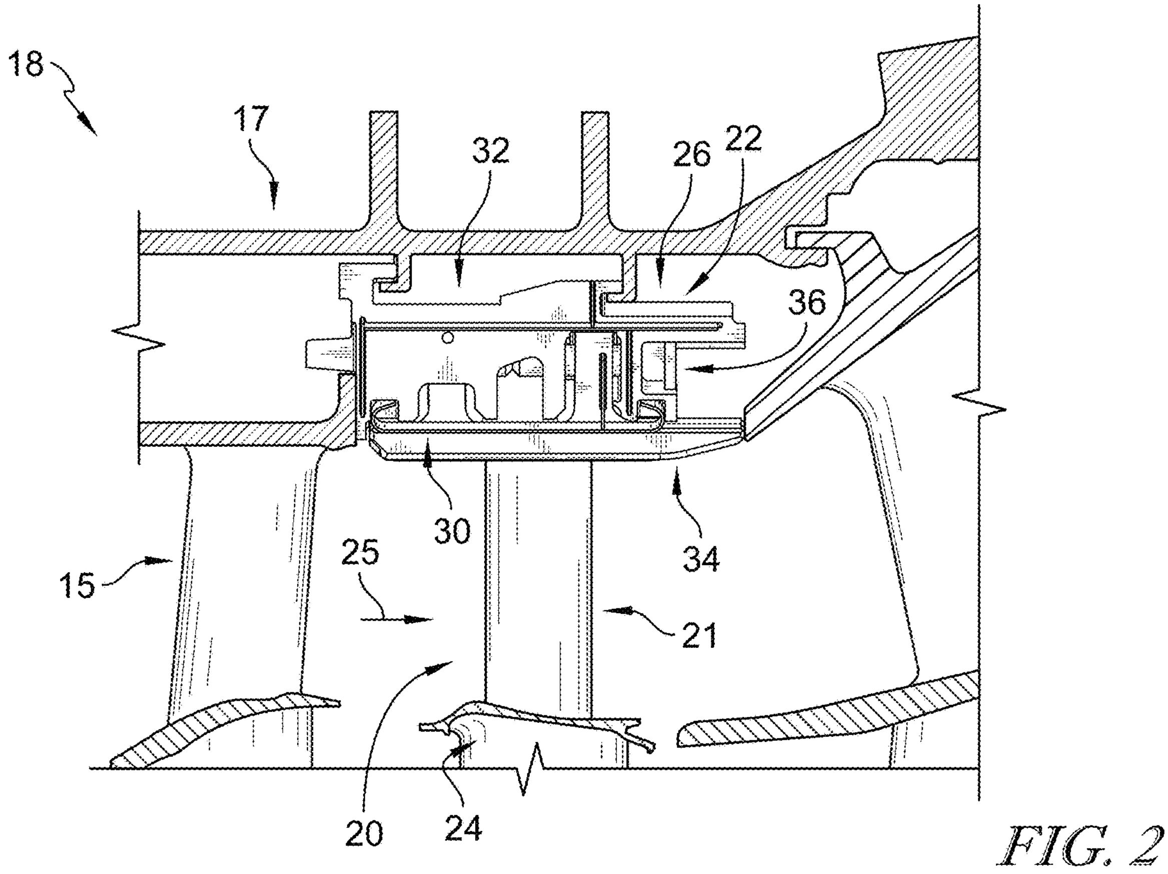
FIG. 2 is a cutaway perspective view of a portion of the turbine shroud assembly of FIG. 1 showing one of the turbine wheel assemblies and a first shroud segment of a plurality of shroud segments arranged around the turbine wheel assembly, the first shroud segment including a first carrier segment, a first blade track segment that defines a portion of a gas path of the turbine, and a first retainer that couples the first blade track segment with the first carrier segment, and further showing that strip seals of the turbine shroud assembly extend circumferentially into the first carrier segment and engage a radial outer surface of the first blade track segment to block gases from passing between the first shroud segment and a circumferentially adjacent second shroud segment.

The turbine 18 includes at least one turbine wheel assembly 20 and a turbine shroud assembly 22 positioned to surround the turbine wheel assembly 20 as shown in FIGS. 1 and 2. The turbine wheel assembly 20 includes a plurality of blades 21 coupled to a rotor disk 24 for rotation with the rotor disk 24. The hot, high-pressure combustion products from the combustor 16 are directed toward the blades 21 of the turbine wheel assemblies 20 along a gas path 25. The turbine wheel assembly 20 further includes a plurality of vanes 15 as shown in FIG. 2. The turbine shroud assembly 22 is coupled to an outer case 17 of the gas turbine engine 10 and extends around the turbine wheel assembly 20 to block gases from passing over the blades 21 during use of the turbine 18 in the gas turbine engine 10.

Figure 5:
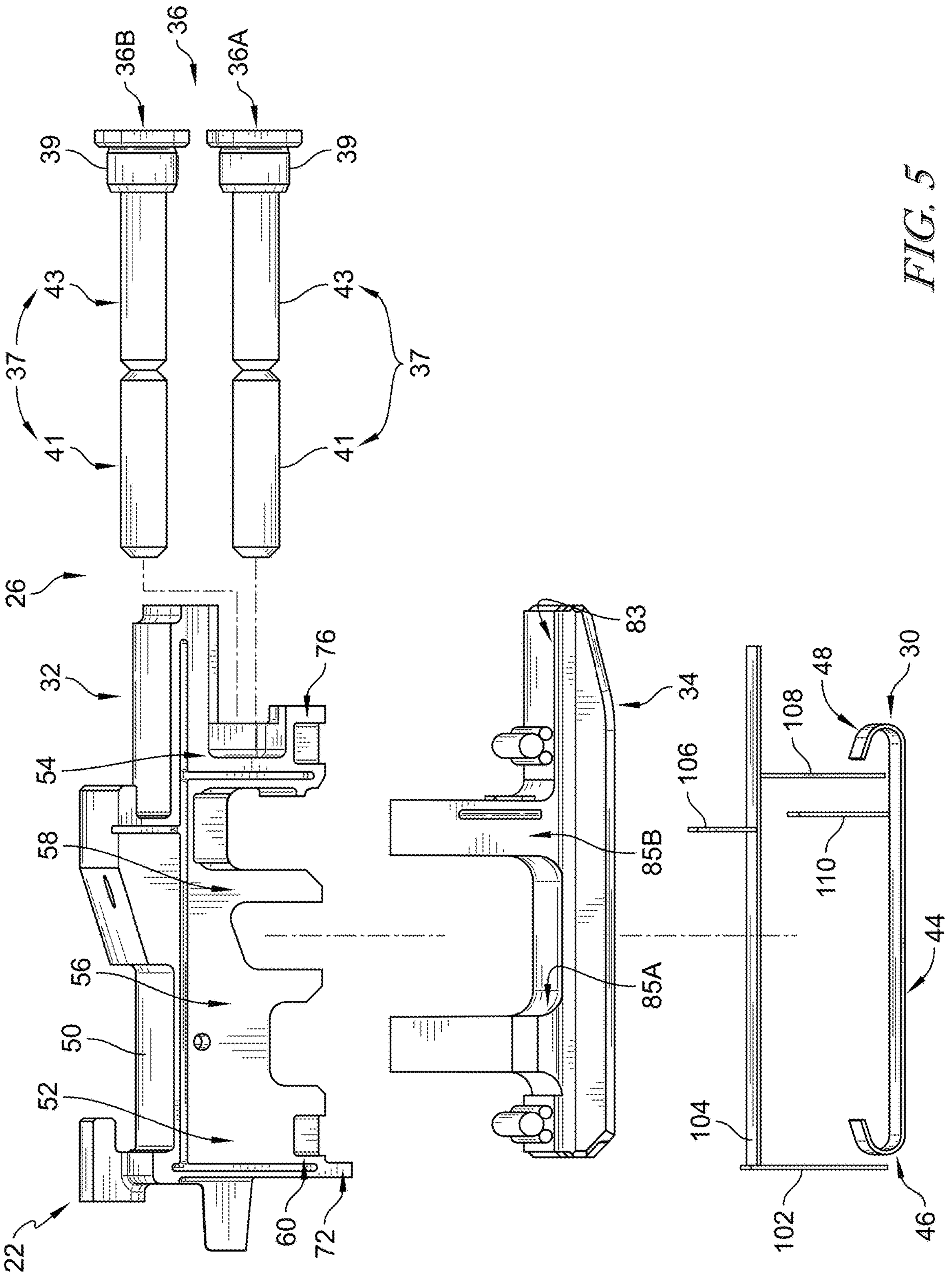
FIG. 5 is an exploded view the portion of the turbine shroud assembly of FIG. 3 showing the first carrier segment, the first blade track segment, the damping strip seal, and the first retainer having two retainer assemblies circumferentially spaced apart from one another, and further suggesting that the damping strip seal slides into the first shroud segment so that the body segment lies on the radial outer surface of the first blade track segment, the first end portion extends into and engages the first seal-retaining recess, and the second end portion extends into and engages the second seal-retaining recess.
Figure 6:
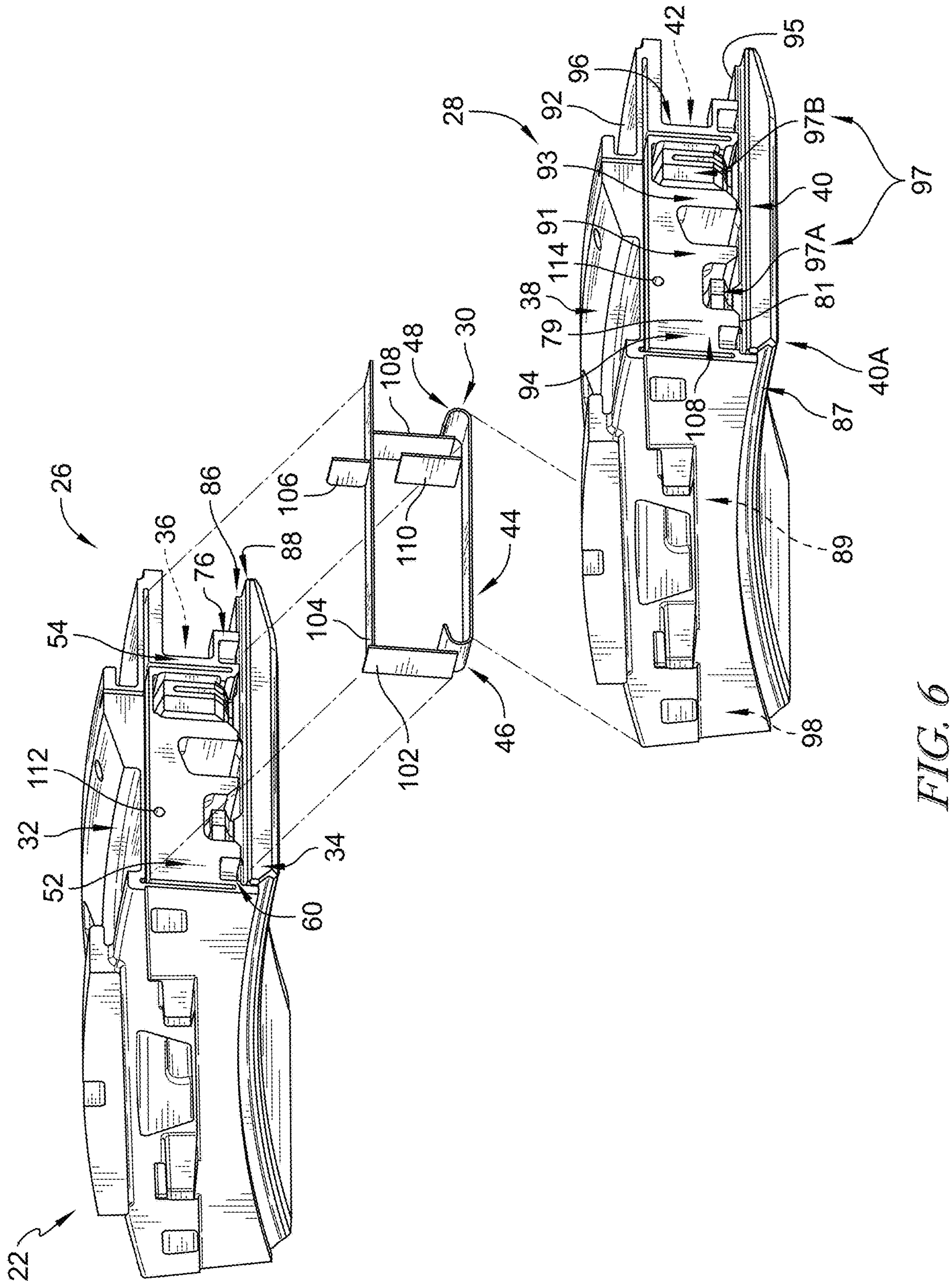
FIG. 6 is an exploded view of the first and second shroud segments used in the gas turbine engine of FIG. 1 showing the first shroud segment and the second shroud segment arranged circumferentially adjacent the first shroud segment, the second shroud segment including a second carrier segment and a second blade track segment supported by the second carrier segment, and further suggesting that the damping strip seal extends circumferentially into the first shroud segment and the second shroud segment to block gases from passing between the first shroud segment and the second shroud segment.

The turbine shroud assembly 22 includes a plurality of shroud segments and a plurality of strip seals between adjacent shroud segments as suggested in FIGS. 2 and 6. Of the plurality of shroud segments, a first shroud segment 26 and a second shroud segment 28 are discussed in detail below. Likewise, a damping strip seal 30 included in the plurality of strips seals used in the turbine shroud assembly 22 is shown in FIGS. 2-6. The first shroud segment 26, the second shroud segment 28, and the damping strip seal 30 are representative of other adjacent shroud segments included in the turbine shroud assembly 22.

Figure 3:
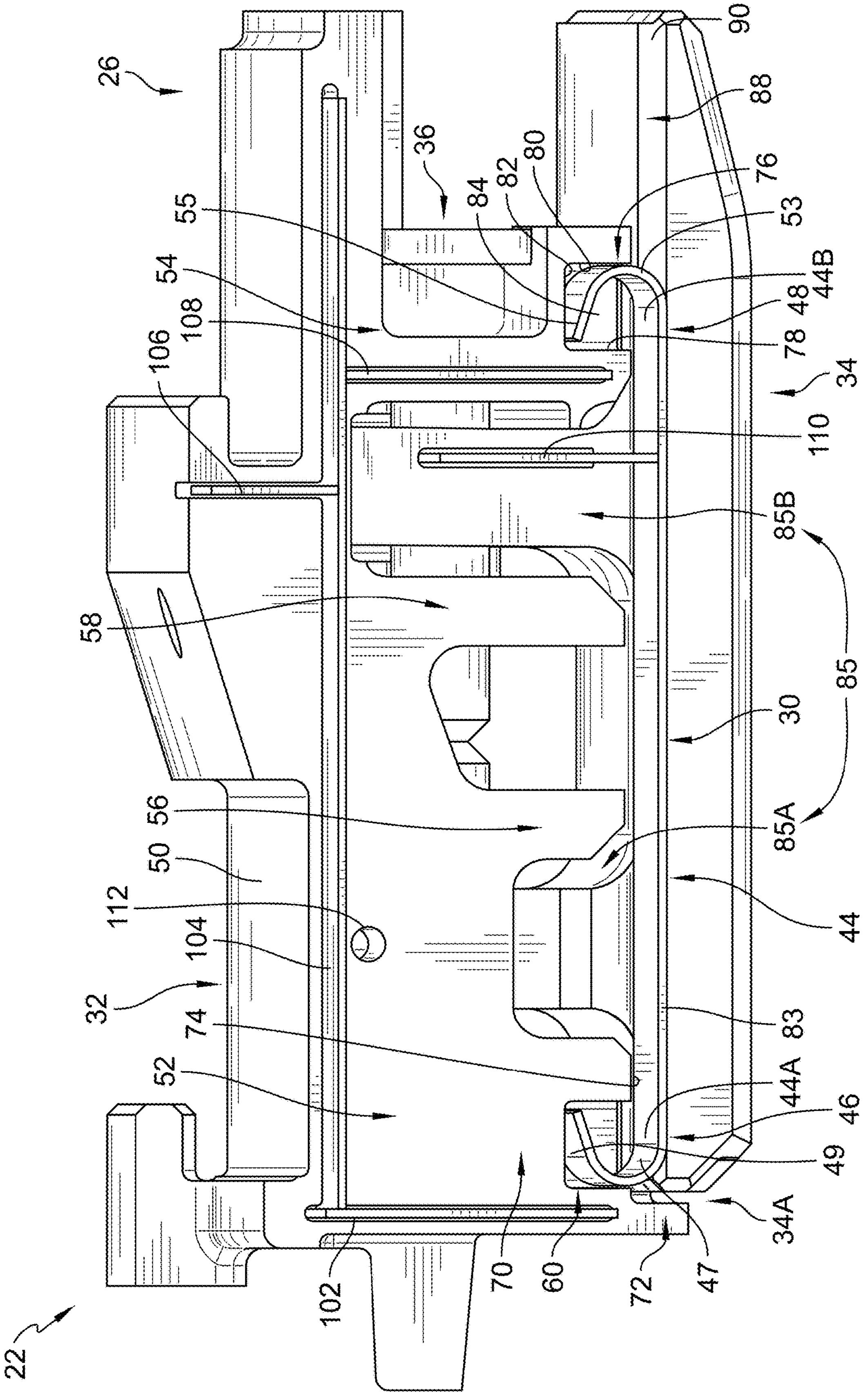
FIG. 3 is a detailed view of the turbine shroud assembly of FIG. 2 showing that the strips seals include a damping strip seal that includes a body segment that extends axially along the radial outer surface of the first blade track segment, a first end portion that extends radially outward and axially aft from the body segment and into a first seal-retaining recess formed in the first carrier segment, and a second end portion that extends radially outward and axially forward from the body segment and into a second seal-retaining recess formed in the first carrier segment, and further showing that the first end portion and the second end portion each engage the first carrier segment to urge the body segment radially inward against the first blade track segment to dampen flutter movement of the damping strip seal relative to the first shroud segment.

The plurality of strip seals includes strip seals 102, 104, 106, 108, 110 as shown in FIGS. 3 and 6. Any of the strip seals 102, 104, 106, 108, 110 may be included or omitted from the plurality of strip seals. The strip seals 102, 104, 106, 108, 110 are representative of more conventional strip seals. The damping strip seal 30 includes a first end portion 46 and a second end portion 48 that urge the damping strip seal 30 radially inward as suggested in FIG. 3.

Figure 8:
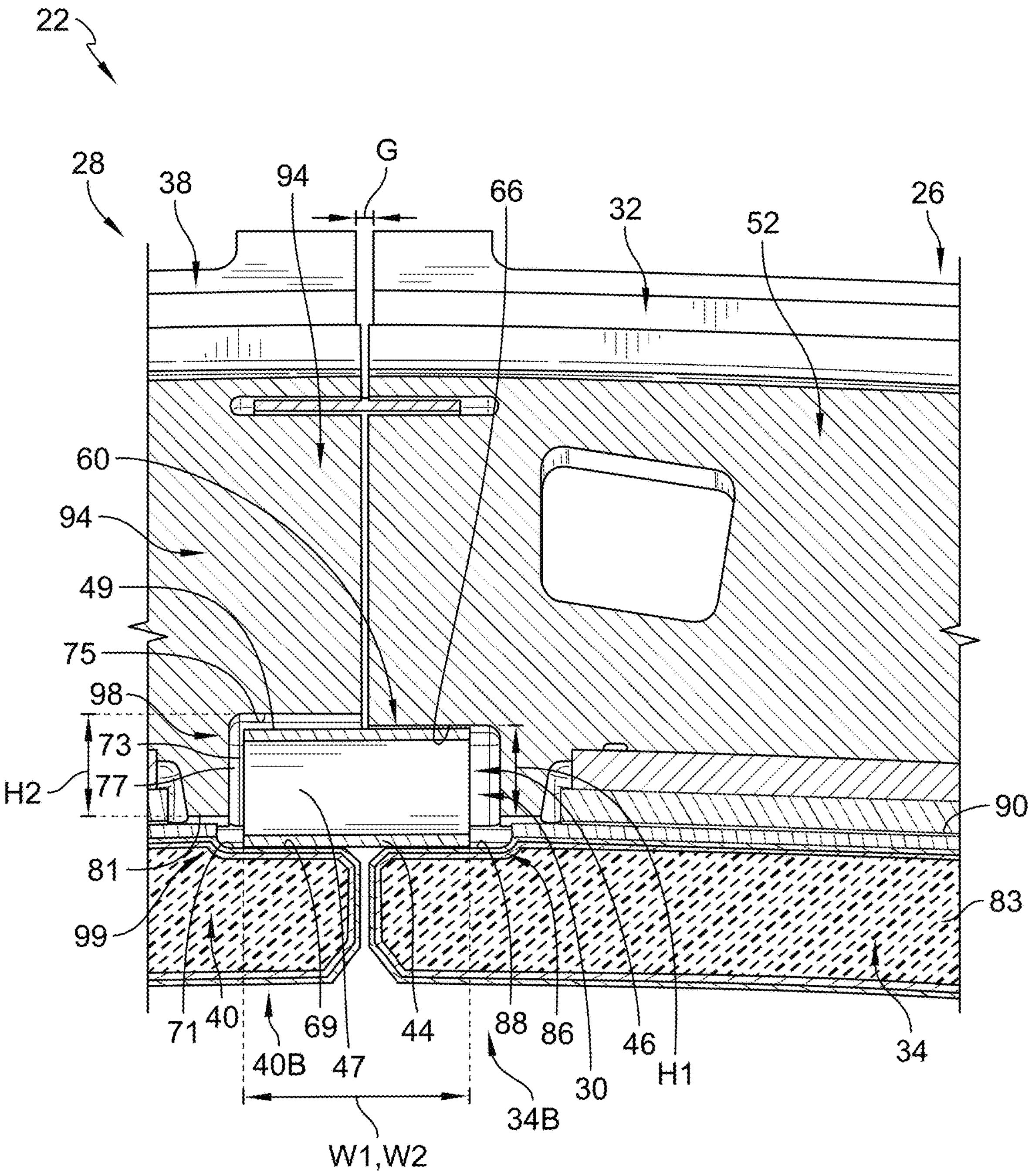
FIG. 8 is a cross-sectional view through the first and second shroud segments of the turbine shroud assembly of FIG. 1 showing that the first shroud segment and the second shroud segment are assembled adjacent one another and the body segment of the damping strip seal extends circumferentially between the first shroud segment and the second shroud segment, and further showing that the first seal-retaining recess formed in the first carrier segment has a first height that is less than a second height of a third seal-retaining recess formed in the second carrier segment so that the first end portion of the damping strip seal only engages the first carrier segment.

The second shroud segment 28 is arranged circumferentially adjacent the first shroud segment 26 about the central axis 11. A circumferential gap G is formed between the first shroud segment 26 and the second shroud segment 28 as shown in FIG. 8. Though the turbine shroud assembly 22 is shown and described as having two shroud segments 26, 28 and one damping strip seal 30, the turbine shroud assembly 22 includes additional shroud segments and damping strip seals so that the turbine shroud assembly 22 extends entirely circumferentially about the central axis 11 as shown in FIG. 1.

Figure 4:
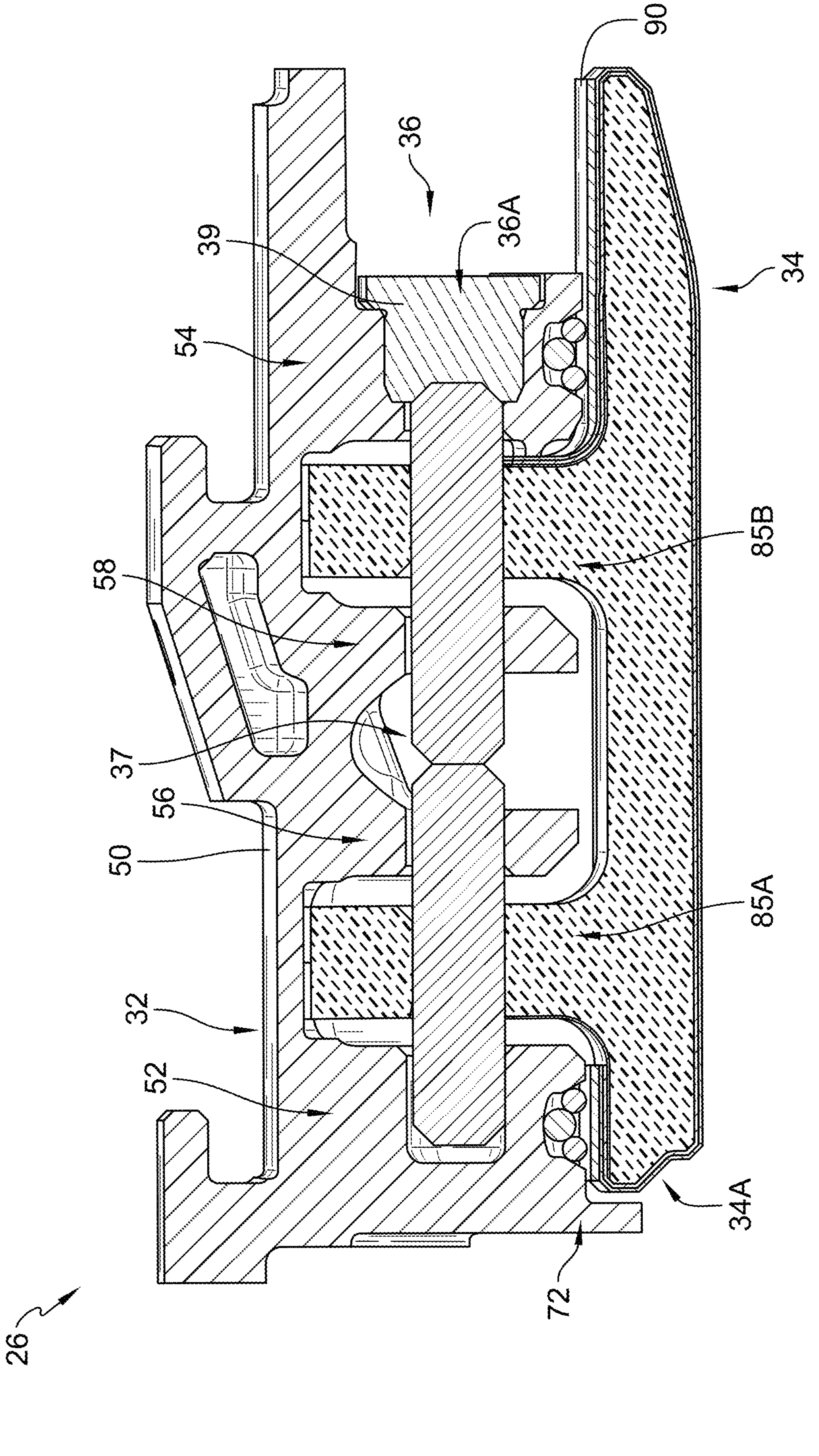
FIG. 4 is a cross-sectional view of the turbine shroud assembly of FIG. 3 showing that the first carrier segment includes an outer wall, a first flange that extends radially inward from the outer wall, and a second flange axially spaced apart from the first flange and extending radially inward from the outer wall, and further showing that the first retainer extends through the first blade track segment and the first carrier segment to couple the first blade track segment to the first carrier segment.

The first shroud segment 26 includes a first carrier segment 32, a first blade track segment 34, and a first retainer 36 as shown in FIGS. 3-5. The first carrier segment 32 is arranged circumferentially at least partway around the central axis 11 and is coupled with the outer case 17 with hook features in the illustrative embodiment. The first blade track segment 34 is supported by the first carrier segment 32 to define a portion of the gas path 25. The first retainer 36 extends axially through the first carrier segment 32 and the first blade track segment 34 to couple the first carrier segment 32 and the first blade track segment 34 together.

The second shroud segment 28 includes a second carrier segment 38, a second blade track segment 40, and a second retainer 42 as shown in FIG. 6. The second carrier segment 38 is arranged circumferentially at least partway around the central axis 11 and is coupled with the outer case 17 with hook features. The second blade track segment 40 is supported by the second carrier segment 38 to define another portion of the gas path 25. The second retainer 42 extends axially through the second carrier segment 38 and the second blade track segment 40 to couple the second carrier segment 38 and the second blade track segment 40 together.

The damping strip seal 30 extends circumferentially into the first shroud segment 26 and the second shroud segment 28 as suggested in FIG. 6 and shown in FIG. 8. The damping strip seal 30, along with the other strip seals 102, 104, 106, 108, 110, blocks gases in the gas path 25 from passing radially outward and circumferentially between the first shroud segment 26 and the second shroud segment 28 through the circumferential gap G.

Fluttering of strip seals may be a concern in turbine shroud assemblies. Fluttering movement of a strip seal may reduce the life of the strip seal. To minimize fluttering, and thus, reduce the possibility of failure, the damping strip seal 30 of the present disclosure is urged radially against the blade track segments 34, 40 to dampen any flutter or vibration.

The damping strip seal 30 includes a body segment 44, a first end portion 46, and a second end portion 48 as shown in FIGS. 3 and 5. The body segment 44 extends axially along the first blade track segment 34 and the second blade track segment 40. The first end portion 46 and the second end portion 48 each engage the first carrier segment 32 to urge the body segment 44 of the damping strip seal 30 radially inward against the first blade track segment 34 and the second blade track segment 40. The urging of the body segment 44 against the first blade track segment 34 and the second blade track segment 40 dampens flutter movement of the damping strip seal 30 relative to the first blade track segment 34 and the second blade track segment 40 during use of the turbine shroud assembly 22.

Turning back to the first shroud segment 26, the first carrier segment 32 of the first shroud segment 26 includes a first outer wall 50, a first flange 52, and a second flange 54 as shown in FIG. 3. The first flange 52 extends radially inward from the first outer wall 50. The second flange 54 is axially spaced apart from the first flange 52 and extends radially inward from the first outer wall 50.

Figure 7:
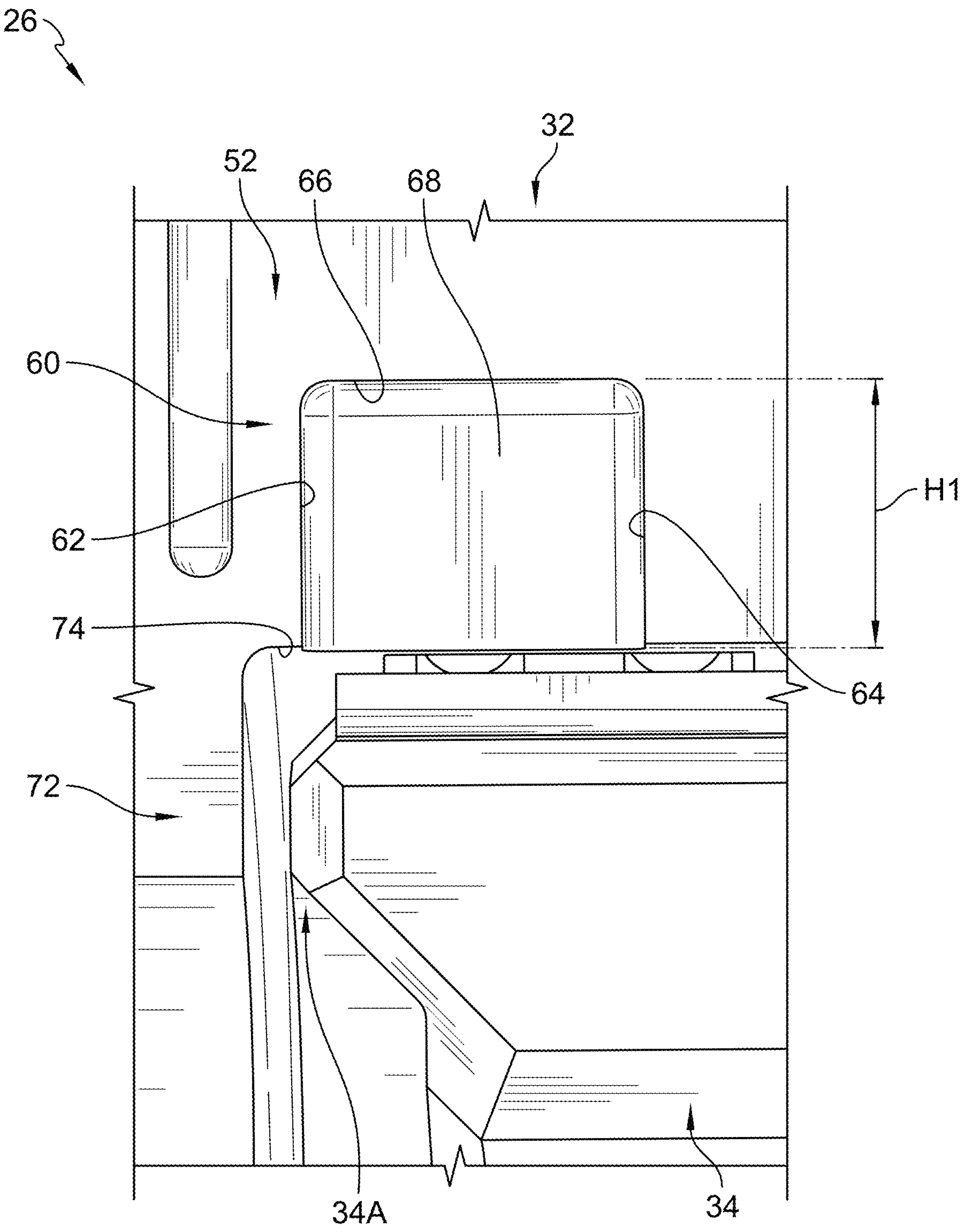
FIG. 7 is a detailed view of the first seal-retaining recess of FIG. 3 formed in the first flange of the first carrier segment showing that the first seal-retaining recess extends radially outward into the first flange from a radially inward facing surface of the first flange.

The first flange 52 is formed to include a first seal-retaining recess 60 as shown in FIGS. 3 and 7. The first seal-retaining recess 60 is defined by a first circumferentially-extending face 62, a second circumferentially-extending face 64, a first axially-extending face 66, and a second axially-extending face 68. The first circumferentially-extending face 62 is located axially opposite and axially forward of the second circumferentially-extending face 64. The first axially-extending face 66 extends between and interconnects the first circumferentially-extending face 62 and the second circumferentially-extending face 64. The first axially-extending face 66 faces toward the first blade track segment 34. The second axially-extending face 68 extends between and interconnects the first circumferentially-extending face 62 and the second circumferentially-extending face 64. The second axially-extending face 68 faces toward the second carrier segment 38.

The first seal-retaining recess 60 receives the first end portion 46 of the damping strip seal 30 therein as shown in FIG. 3. The first seal-retaining recess 60 has a first height H1 as shown in FIGS. 7 and 8.

The first flange 52 of the first carrier segment 32 includes a first wall 70 formed to include a radially inward facing surface 74 as shown in FIG. 3. The first seal-retaining recess 60 extends radially outward into the first flange 52 from the radially inward facing surface 74. A first protrusion 72 extends radially inward from the first wall 70 axially forward of the first seal-retaining recess 60. The first protrusion 72 is located axially forward of the first blade track segment 34 to cover an axial forward end 34A of the first blade track segment 34. The first protrusion 72 blocks at least a portion of the gases flowing through the gas path 25 from flowing axially into the first end portion 46 of the damping strip seal 30.

The second flange 54 of the first carrier segment 32 is formed to include a second seal-retaining recess 76 as shown in FIG. 3. In the illustrative embodiment, the second seal-retaining recess 76 is substantially similar to the first seal-retaining recess 60. The second seal-retaining recess 76 is defined by a first circumferentially-extending face 78, a second circumferentially-extending face 80, a first axially-extending face 82, and a second axially-extending face 84. The first circumferentially-extending face 78 is located axially opposite and axially forward of the second circumferentially-extending face 80. The first axially-extending face 82 extends between and interconnects the first circumferentially-extending face 78 and the second circumferentially-extending face 80. The first axially-extending face 82 faces toward the first blade track segment 34. The second axially-extending face 84 extends between and interconnects the first circumferentially-extending face 78 and the second circumferentially-extending face 80. The second axially-extending face 84 faces toward the second carrier segment 38.

The second seal-retaining recess 76 receives the second end portion 48 of the damping strip seal 30 therein as shown in FIG. 3. The second seal-retaining recess 76 has the first height H1 (i.e., the first circumferentially-extending face 78, the second circumferentially-extending face 80, the second axially-extending face 84 have the first height H1).

In some embodiments, the first carrier segment 32 further includes a third flange 56 and a fourth flange 58 as shown in FIG. 3. Each of the third flange 56 and the fourth flange 58 extends radially inward from the first outer wall 50. The third flange 56 is located axially between the first flange 52 and the fourth flange 58. The fourth flange 58 is located axially between the third flange 56 and the second flange 54. The third and fourth flanges 56, 58 may be inner flanges or clevises that are both located axially inward of the first flange 52 and the second flange 54.

Each of the flanges 52, 54, 56, and 58 of the first carrier segment 32 is formed to include a hole that receives the first retainer 36 therein as shown in FIGS. 3 and 4. Illustratively, the first carrier segment 32 is made of metallic materials.

The first blade track segment 34 includes a first shroud wall 83 and a first attachment feature 85 that extends radially outward from the first shroud wall 83 as shown in FIGS. 3-5. The first shroud wall 83 extends circumferentially partway around the central axis 11. Illustratively, the first attachment feature 85 includes a first attachment flange 85A and a second attachment flange 85B axially aft of the first attachment flange 85A. Each of the attachment flanges 85A, 85B is formed to include a hole that receives the first retainer 36 therein. The first attachment flange 85A is located axially between the first flange 52 and the third flange 56 as shown in FIG. 3. The second attachment flange 85B is located axially between the fourth flange 58 and the second flange 54. Illustratively, the first blade track segment 34 is made of ceramic matrix composite materials.

A circumferential end 34B of the first shroud wall 83 abuts the second blade track segment 40 as shown in FIG. 8. The circumferential end 34B is formed with a first recess 86 that defines a first shoulder 88 of the first blade track segment 34. The first shroud wall 83 slopes radially inwardly at the circumferential end 34B to define the first shoulder 88. The first shroud wall 83 has a first radial outer surface 90 that faces toward the first carrier segment 32. The first radial outer surface 90 is formed on the first shoulder 88. The first radial outer surface 90 is exposed to air located radially between the first carrier segment 32 and the first blade track segment 34.

The body segment 44 of the damping strip seal 30 slides onto the first radial outer surface 90 of the first shoulder 88 as shown in FIG. 8. The first recess 86 of the first blade track segment 34 is substantially aligned with the second axially-extending face 68 of the first seal-retaining recess 60 and the second axially-extending face 84 of the second seal-retaining recess 76 as shown in FIG. 8.

In the illustrative embodiment, the first retainer 36 includes two retainer assemblies 36A, 36B that each have a corresponding mount pin 37 and a corresponding mount plug 39 as shown in FIG. 5. The two retainer assemblies 36A, 36B, along with the corresponding mount pin 37 and the corresponding mount plug 39 are spaced apart circumferentially from each other as shown in FIG. 5.

The first retainer 36 couples the first blade track segment 34 to the first carrier segment 32 as shown in FIGS. 3 and 4. The mount pin 37 of each retainer assembly 36A, 36B extends through the first blade track segment 34 and into the first carrier segment 32. Each mount plug 39 fits into the first carrier segment 32 axially aft of the corresponding mount pin 37 and circumferentially aligned with the corresponding mount pin 37.

In the illustrative embodiment, each mount pin 37 of each retainer assembly 36A, 36B includes a forward pin 41 and an aft pin 43 as shown in FIG. 5. The forward pin 41 and the aft pin 43 of each mount pin 37 are circumferentially aligned. The forward pin 41 is located axially forward of the corresponding aft pin 43. In this embodiment, the forward pin 41 is separate from the aft pin 43 so as to allow for independent loading during use in the gas turbine engine 10. In some embodiments, the mount pin 37 is formed as a single pin. Each mount pin 37 is inserted from an axially aft end of the first shroud segment 26.

The second carrier segment 38 of the second shroud segment 28 includes a second outer wall 92, a fifth flange 94, and a sixth flange 96 as shown in FIG. 6. The fifth flange 94 extends radially inward from the second outer wall 92. The sixth flange 96 is axially spaced apart from the fifth flange 94 and extends radially inward from the second outer wall 92.

The fifth flange 94 is formed to include a third seal-retaining recess 98 as shown in FIG. 8. The third seal-retaining recess 98 is defined by a first circumferentially-extending face 73, a second circumferentially-extending face (not shown), a first axially-extending face 75, and a second axially-extending face 77. The first circumferentially-extending face 73 is located axially opposite and axially forward of the second circumferentially-extending face. The first axially-extending face 75 extends between and interconnects the first circumferentially-extending face 73 and the second circumferentially-extending face. The first axially-extending face 75 faces toward the second blade track segment 40. The second axially-extending face 77 extends between and interconnects the first circumferentially-extending face 73 and the second circumferentially-extending face. The second axially-extending face 77 faces toward the first carrier segment 32.

The third seal-retaining recess 98 has a second height H2 (i.e., the first circumferentially-extending face 73, the second circumferentially-extending face, the second axially-extending face 77 have the second height H2). The first seal-retaining recess 60 and the third seal-retaining recess 98 are aligned with one another while the first shroud segment 26 and the second shroud segment 28 are assembled adjacent to one another as shown in FIG. 8. In the illustrative embodiment, the second height H2 of the third seal-retaining recess 98 is greater than the first height H1 of the first seal-retaining recess 60.

The fifth flange 94 of the second carrier segment 38 includes a second wall 79 formed to include a radially inward facing surface 81 as shown in FIGS. 6 and 8. The third seal-retaining recess 98 extends radially outward into the fifth flange 94 from the radially inward facing surface 81. A second protrusion 87 extends radially inward from the second wall 79 to cover an axial forward end 40A of the second blade track segment 40.

The sixth flange 96 of the second carrier segment 38 is formed to include a fourth seal-retaining recess 89 as suggested in FIG. 6. The fourth seal-retaining recess 89 is the same as the third seal-retaining recess 98 such that the description of the third seal-retaining recess 98 also applies to the fourth seal-retaining recess 89. The fourth seal-retaining recess 89 has the second height H2. The second seal-retaining recess 76 and the fourth seal-retaining recess 89 are aligned with one another while the first shroud segment 26 and the second shroud segment 28 are assembled adjacent to one another. In the illustrative embodiment, the second height H2 of the fourth seal-retaining recess 89 is greater than the first H1 of the second seal-retaining recess 76.

The second carrier segment 38 further includes a seventh flange 91 and an eighth flange 93 as shown in FIG. 6. Each of the seventh flange 91 and the eighth flange 93 extend radially inward from the second outer wall 92. The seventh flange 91 is located axially between the fifth flange 94 and the eighth flange 93. The eighth flange 93 is located axially between the seventh flange 91 and the sixth flange 96. The seventh and eighth flanges 91, 93 may be inner flanges or clevises that are both located axially inward of the fifth flange 94 and the sixth flange 96. Once the turbine shroud assembly 22 is assembled to extend entirely circumferentially about the central axis 11, the inner flanges (i.e., the third flange 56 and the fourth flange 58 of the first carrier segment 32) cooperate with the adjacent inner flanges (i.e., the seventh flange 91 and the eighth flange 93 of the second carrier segment 38) to form a full circumferential clevis.

Each of the flanges 94, 96, 91, and 93 of the second carrier segment 38 is formed to include a hole that receives the second retainer 42 therein. Illustratively, the second carrier segment 38 is made of metallic materials.

The second blade track segment 40 includes a second shroud wall 95 and a second attachment feature 97 that extends radially outward from the second shroud wall 95 as shown in FIG. 6. The second shroud wall 95 extends circumferentially partway around the central axis 11. Illustratively, the second attachment feature 97 includes a third attachment flange 97A and a fourth attachment flange 97B axially aft of the third attachment flange 97A. Each of the attachment flanges 97A, 97B is formed to include a hole that receives the second retainer 42 therein. The third attachment flange 97A is located axially between the fifth flange 94 and the seventh flange 91. The fourth attachment flange 97B is located axially between the eighth flange 93 and the sixth flange 96. Illustratively, the second blade track segment 40 is made of ceramic matrix composite materials.

A circumferential end 40B of the second shroud wall 95 abuts the first blade track segment 34 as shown in FIG. 8. The circumferential end 40B is formed with a second recess 99 that defines a second shoulder 71 of the second blade track segment 40. The second shroud wall 95 slopes radially inwardly at the circumferential end 40B to define the second shoulder 71. The second shroud wall 95 has a second radial outer surface 69 that faces toward the second carrier segment 38. The second radial outer surface 69 is formed on the second shoulder 71. The second radial outer surface 69 is exposed to air located radially between the second carrier segment 38 and the second blade track segment 40.

The second recess 99 of the second blade track segment 40 is substantially aligned with the second axially-extending face 77 of the third seal-retaining recess 98 as shown in FIG. 8. The second retainer 42 is the same as the first retainer 36 such that description of the first retainer 36 also applies to the second retainer 42.

The damping strip seal 30 includes the body segment 44, the first end portion 46, and the second end portion 48 as shown in FIG. 3. In the illustrative embodiment, the damping strip seal 30 is integrally formed as a single, one-piece component. The body segment 44 is substantially flat relative to the central axis 11. The body segment 44 engages the first radial outer surface 90 of the first shoulder 88 and the second radial outer surface 69 of the second shoulder 71 as shown in FIG. 8. A radial inner surface of the body segment 44 directly contacts the radial outer surfaces 90, 69 of the blade track segments 34, 40, and a radial outer surface of the body segment 44 is exposed to air that is radially between the carrier segments 32, 38 and the blade track segments 34, 40. The body segment 44 extends axially along the first radial outer surface 90 of the first blade track segment 34 and the second radial outer surface 69 of the second blade track segment 40 and circumferentially between the blade track segments 34, 40 to block the circumferential gap G.

The first recess 86 of the first blade track segment 34 and the second recess 99 of the second blade track segment 40 retain the damping strip seal 30 circumferentially between the first blade track segment 34 and the second blade track segment 40 as suggested in FIG. 8. The damping strip seal 30 may slide circumferentially a marginal amount, however, the recesses 86, 99 block the damping strip seal 30 from sliding such that the circumferential gap G is no longer blocked.

The first end portion 46 extends along a first curvilinear path from a first axial end 44A of the body segment 44 as shown in FIG. 3. The first end portion 46 includes a radially-extending portion 47 and an axially-extending portion 49. The radially-extending portion 47 extends and turns radially outward from the first axial end 44A of the body segment 44. The axially-extending portion 49 extends and turns axially aft from the radially-extending portion 47. The radially-extending portion 47 curves radially outwardly from the first axial end 44A of the body segment 44 such that a sharp corner (i.e., a 90 degree angle) is not formed between the radially-extending portion 47 and the first axial end 44A. The axially-extending portion 49 curves axially aft from the radially-extending portion 47 such that a sharp corner (i.e., a 90 degree angle) is not formed between the axially-extending portion 49 and the radially-extending portion 47.

The first end portion 46 extends into both of the first seal-retaining recess 60 of the first carrier segment 32 and the third seal-retaining recess 98 of the second carrier segment 38 as shown in FIG. 8. The axially-extending portion 49 contacts the first axially-extending face 66 of the first seal-retaining recess 60. Because of the height differences (H1 and H2) between the first and the third seal-retaining recesses 60, 98, the axially-extending portion 49 does not contact the first axially-extending face 75 of the third seal-retaining recess 98 as shown in FIG. 8. The engagement between the first end portion 46 and the first seal-retaining recess 60 urges the body segment 44 of the damping strip seal 30 radially inward against the first and second radial outer surfaces 90, 69 of the blade track segments 34, 40.

The second end portion 48 extends along a second curvilinear path from a second axial end 44B of the body segment 44 as shown in FIG. 3. The second end portion 48 includes a radially-extending portion 53 and an axially-extending portion 55. The radially-extending portion 53 extends and turns radially outward from the second axial end 44B of the body segment 44. The axially-extending portion 55 extends and turns axially forward from the radially-extending portion 53. The radially-extending portion 53 curves radially outwardly from the second axial end 44B of the body segment 44 such that a sharp corner (i.e., a 90 degree angle) is not formed between the radially-extending portion 53 and the second axial end 44B. The axially-extending portion 55 curves axially forward from the radially-extending portion 53 such that a sharp corner (i.e., a 90 degree angle) is not formed between the axially-extending portion 55 and the radially-extending portion 53. In the illustrative embodiment, the first end portion 46 and the second end portion 48 are mirrored shapes of one another.

Though not specifically shown, the second end portion 48 is configured the same as the first end portion 46. The second end portion 48 extends into both of the second seal-retaining recess 76 of the first carrier segment 32 and the fourth seal-retaining recess 89 of the second carrier segment 38. The axially-extending portion 55 of the second end portion 48 contacts the first axially-extending face 82 of the second seal-retaining recess 76 as shown in FIG. 3. Because of the height differences (H1 and H2) between the second and the fourth seal-retaining recesses 76, 89, the axially-extending portion 55 of the second end portion 48 does not contact the first axially-extending face of the fourth seal-retaining recess 89. The engagement between the second end portion 48 and the second seal-retaining recess 76 urges the body segment 44 of the damping strip seal radially inward against the first and second radial outer surfaces 90, 69 of the blade track segments 34, 40.

A space radially outward of the body segment 44 of the damping strip seal 30, such as the space axially between the third flange 56 and the fourth flange 58, is pressurized. Thus, a high load pushes downwardly on the body segment 44 at a center of the body segment 44 axially between the first axial end 44A and the second axial end 44B.

The seal-retaining recesses 60, 76, 98, 89 retain the damping strip seal 30 axially relative to the first shroud segment 26 and the second shroud segment 28 so that the damping strip seal 30 does not escape from the shroud segments 26, 28 fore and aft. The seal-retaining recesses 60, 76, 98, 89 also retain the damping strip seal 30 radially relative to the first shroud segment 26 and the second shroud segment 28.

The body segment 44 of the damping strip seal 30 has a first width W1 as shown in FIG. 8. The first end portion 46 has a second width W2, and the second end portion 48 has the second width W2. The second width W2 is substantially the same as the first width W1.

In some embodiments, the turbine shroud assembly 22 further includes strip seals 102, 104, 106, 108, 110 as shown in FIGS. 3 and 5. Each of the strip seals 102, 104, 106, 108 extends into the first carrier segment 32 and the second carrier segment 38. The strip seal 110 extends into each of the second attachment flange 85B of the first blade track segment 34 and the fourth attachment flange 97B of the second blade track segment 40.

The first carrier segment 32 and the second carrier segment 38 are each formed to include grooves sized to receive the strip seals 102, 104, 106, 108 therein as shown in FIGS. 3, 5, and 6. The second attachment flange 85B of the first blade track segment 34 and the fourth attachment flange 97B of the second blade track segment 40 are each formed to include a groove sized to receive the strip seal 110 therein. The strip seals 102, 104, 106, 108, 110 provide additional sealing between the first shroud segment 26 and the second shroud segment 28.

Each circumferential side of the first carrier segment 32 is formed to include a drain hole 112 extending through a portion of the first carrier segment 32 as shown in FIG. 3. Illustratively, the drain holes 112 are axially aligned with the first attachment flange 85A of the first blade track segment 34. Any leaked fuel of the gas turbine engine 10 may drain out of the first shroud segment 26 through the drain holes 112 (for example through the segments located near bottom center). The second carrier segment 38 includes drain holes 114 that are substantially similar to the drain holes 112.

Figure 9:
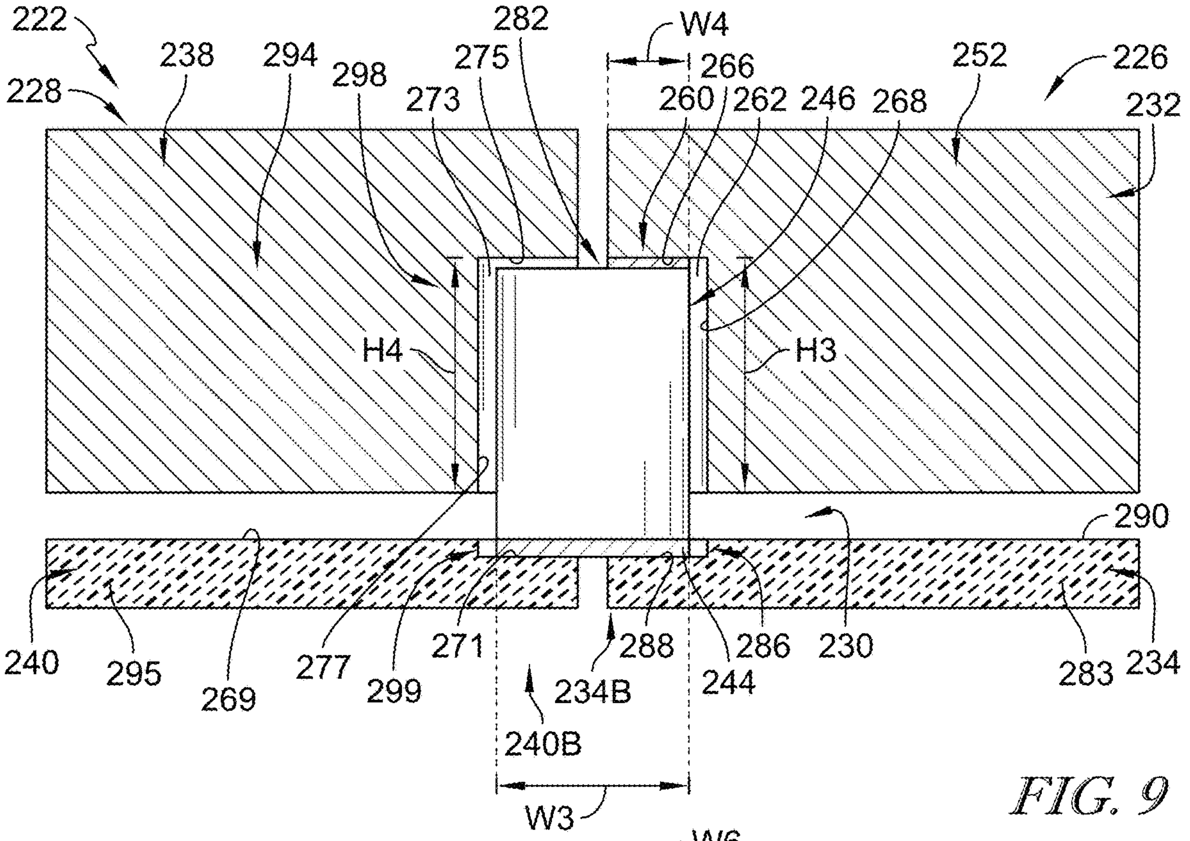
FIG. 9 is a diagrammatic section view of another embodiment of first and second shroud segments of a turbine shroud assembly for use in the gas turbine engine of FIG. 1 showing that a first carrier segment of the first shroud segment is formed to include a first seal-retaining recess and a second carrier segment of the second shroud segment is formed to include a third seal-retaining recess, the first seal-retaining recess and the third seal-retaining recess having substantially similar heights, and further showing that a first end portion of a damping strip seal is formed to include a notch so that the first end portion of the damping strip seal only engages the first carrier segment.

Another embodiment of a turbine shroud assembly 222 in accordance with the present disclosure is shown in FIG. 9. The turbine shroud assembly 222 is substantially similar to the turbine shroud assembly 22 shown in FIGS. 1-8 and described herein. Accordingly, similar reference numbers in the 200 series indicate features that are common between the turbine shroud assembly 22 and the turbine shroud assembly 222. The description of the turbine shroud assembly 22 is incorporated by reference to apply to the turbine shroud assembly 222, except in instances when it conflicts with the specific description and the drawings of the turbine shroud assembly 222.

The turbine shroud assembly 222 includes a first shroud segment 226, a second shroud segment 228, and a damping strip seal 230 as shown in FIG. 9. The second shroud segment 228 is arranged circumferentially adjacent the first shroud segment 226. A circumferential gap G is formed between the first shroud segment 226 and the second shroud segment 228.

The first shroud segment 226 includes a first carrier segment 232, a first blade track segment 234, and a first retainer (not shown, but the same as the first retainer 36) as shown in FIG. 9. The second shroud segment 228 includes a second carrier segment 238, a second blade track segment 240, and a second retainer (not shown, but the same as the second retainer 42). The damping strip seal 230 extends circumferentially into the first shroud segment 226 and the second shroud segment 228. The damping strip seal 230 blocks gases in the gas path 25 from passing radially outward and circumferentially between the first shroud segment 226 and the second shroud segment 228 through the circumferential gap G. The damping strip seal 230 includes a body segment 244, a first end portion 246, and a second end portion (not shown, but a mirrored shape of the first end portion 246).

A first flange 252 of the first carrier segment 232 is formed to include a first seal-retaining recess 260 as shown in FIG. 9. The first seal-retaining recess 260 is defined by a first circumferentially-extending face 262, a second circumferentially-extending face, a first axially-extending face 266, and a second axially-extending face 268. The first circumferentially-extending face 262 is located axially opposite and axially forward of the second circumferentially-extending face. The first axially-extending face 266 extends between and interconnects the first circumferentially-extending face 262 and the second circumferentially-extending face. The first axially-extending face 266 faces toward the first blade track segment 234. The second axially-extending face 268 extends between and interconnects the first circumferentially-extending face 262 and the second circumferentially-extending face. The second axially-extending face 268 faces toward the second carrier segment 238.

The first seal-retaining recess 260 has a third height H3 (i.e., the first circumferentially-extending face 262, the second circumferentially-extending face, the second axially-extending face 268 have the third height H3). A second flange of the first carrier segment 232 is formed to include a second seal-retaining recess (not shown, but identical to the first seal-retaining recess 260).

The first blade track segment 234 includes a first shroud wall 283, and a circumferential end 234B of the first shroud wall 283 abuts the second blade track segment 240. The circumferential end 234B is formed with a first recess 286 to define a first shoulder 288 of the first blade track segment 234. The first shroud wall 283 has a first radial outer surface 290 that faces toward the first carrier segment 232. The first radial outer surface 290 is formed on the first shoulder 288.

A fifth flange 294 of the second carrier segment 238 is formed to include a third seal-retaining recess 298 as shown in FIG. 9. The third seal-retaining recess 298 is defined by a first circumferentially-extending face 273, a second circumferentially-extending face (not shown), a first axially-extending face 275, and a second axially-extending face 277. The first circumferentially-extending face 273 is located axially opposite and axially forward of the second circumferentially-extending face. The first axially-extending face 275 extends between and interconnects the first circumferentially-extending face 273 and the second circumferentially-extending face. The first axially-extending face 275 faces toward the second blade track segment 240. The second axially-extending face 277 extends between and interconnects the first circumferentially-extending face 273 and the second circumferentially-extending face. The second axially-extending face 277 faces toward the first carrier segment 232.

The third seal-retaining recess 298 has a fourth height H4 (i.e., the first circumferentially-extending face 273, the second circumferentially-extending face, and the second axially-extending face 277 all have the fourth height H4). The first seal-retaining recess 260 and the third seal-retaining recess 298 are aligned with one another while the first shroud segment 226 and the second shroud segment 228 are assembled adjacent to one another as shown in FIG. 9. In the illustrative embodiment, the fourth height H4 of the third seal-retaining recess 298 is substantially equal to the third height H3 of the first seal-retaining recess 260 as shown in FIG. 9. A sixth flange of the second carrier segment 238 is formed to include a fourth seal-retaining recess (not shown, but identical to the third seal-retaining recess 298).

The second blade track segment 240 includes a second shroud wall 295, and a circumferential end 240B of the second shroud wall 295 abuts the first blade track segment 234. The circumferential end 240B is formed with a second recess 299 that defines a second shoulder 271 of the second blade track segment 240. The second shroud wall 295 has a second radial outer surface 269 that faces toward the second carrier segment 238. The second radial outer surface 269 is formed on the second shoulder 271.

The damping strip seal 230 includes the body segment 244, the first end portion 246, and the second end portion as shown in FIG. 9. The body segment 244 extends axially along the first radial outer surface 290 of the first blade track segment 234 and the second radial outer surface 269 of the second blade track segment 240 and circumferentially between the blade track segments 234, 240 to block the circumferential gap G.

The first end portion 246 is formed to include a notch 282 extending radially inwardly from a radial outer end of the forward seal member 246 as shown in FIG. 9. The notch 282 extends at least partially into the first end portion 246 toward the body segment 244. In other words, at least a portion of the first end portion 246 has a fourth width W4 that is less than a third width W3 of the body segment 244 as shown in FIG. 9. In some embodiments, due to the notch 282 (and the width differences W3 and W4), the first end portion 246 extends into the first seal-retaining recess 260 and into the third seal-retaining recess 298, while contacting the first axially-extending face 266 of the first seal-retaining recess 260 and not contacting the first axially-extending face 275 of the third seal-retaining recess 298. In alternative embodiments, due to the notch 282 (and the width differences W3 and W4), the first end portion 246 extends into the first seal-retaining recess 260 without extending into the third seal-retaining recess 298. Though not shown, the second end portion is configured the same as the first end portion 246 such that the second end portion is formed to include a notch and contacts the second seal-retaining recess of the first carrier segment 232 without contacting the fourth seal-retaining recess of the second carrier segment 238.

Figure 10:
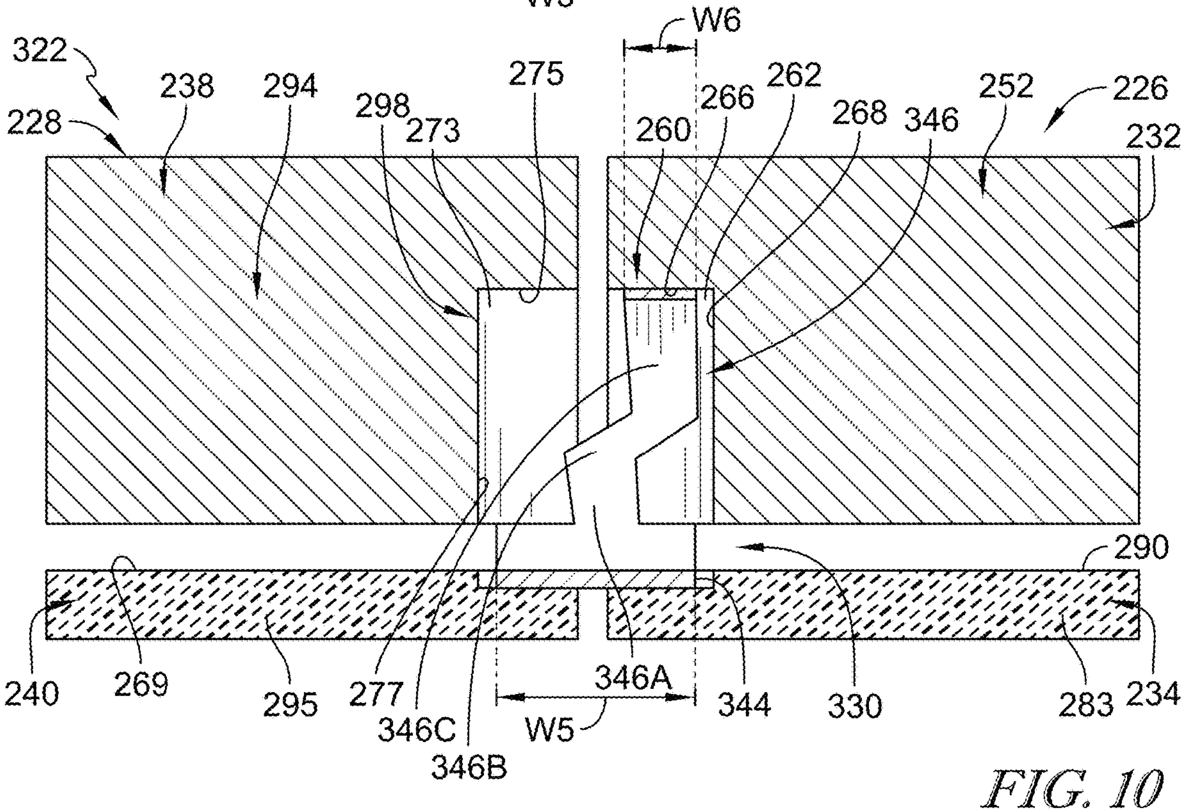
FIG. 10 is a diagrammatic section view of the first shroud segment and the second shroud segment of FIG. 9 including an alternative damping strip seal, the damping strip seal includes a first end portion that extends into both of the first seal-retaining recess and the third seal-retaining recess while only engaging the first carrier segment.

Another embodiment of a damping strip seal 330 for use with a turbine shroud assembly 320 in accordance with the present disclosure is shown in FIG. 10. The damping strip seal 330 is substantially similar to the damping strip seal 30 shown in FIGS. 1-8 and described herein and the damping strip seal 230 shown in FIG. 9 and described herein. Accordingly, similar reference numbers in the 300 series indicate features that are common between the damping strip seal 30, the damping strip seal 230, and the damping strip seal 330. The descriptions of the damping strip seal 30 and the damping strip seal 230 are incorporated by reference to apply to the damping strip seal 330, except in instances when it conflicts with the specific description and the drawings of the damping strip seal 330.

The damping strip seal 330 includes a body segment 344, a first end portion 346, and a second end portion as shown in FIG. 10. The body segment 344 extends axially along the first radial outer surface 290 of the first blade track segment 234 and the second radial outer surface 269 of the second blade track segment 240 and circumferentially between the blade track segments 234, 240 to block the circumferential gap G.

The first end portion 346 of the damping strip seal 330 is formed to include a first portion 346A, a second portion 346B, and a third portion 346C as shown in FIG. 10. The first portion 346A extends radially outward away from the body segment 344. The second portion 346B extends circumferentially relative to the first portion 346A. The second portion 346B extends from the first portion 346A toward the second axially-extending face 268 of the first seal-retaining recess 260. The third portion 346C extends radially outwardly from the second portion 346B. The first portion 346A extends into both of the first seal-retaining recess 260 and the third seal-retaining recess 298. The third portion 346C engages the first axially-extending face 266 of the first seal-retaining recess 260. The first portion 346A and the second portion 346B extend into each of the first seal-retaining recess 260 and the third seal-retaining recess 298.

Illustratively, the third portion 346C extends into the first seal-retaining recess 260 without extending into the third seal-retaining recess 298 so that only the first carrier segment 232 is engaged by the third portion 346C. The first end portion 346 contacts the first axially-extending face 266 of the first seal-retaining recess 260 without contacting the first axially-extending face 275 of the third seal-retaining recess 298.

In other words, the body segment 344 of the damping strip seal 330 has a fifth width W5, and at least a portion of the first end portion 346 has a sixth width W6 that is less than the fifth width W5. The first end portion 346 is shaped so that it extends into each of the first seal-retaining recess 260 and the third seal-retaining recess 298, while only engaging the first seal-retaining recess 260.

Though not shown, the second end portion is configured similarly to the first end portion 346 such that the second end portion only contacts the second seal-retaining recess of the first carrier segment 232. The first end portion 346 (and the second end portion) may be any shape that allows the first end portion 346 to extend into each of the recesses 260, 298, while only engaging the first seal-retaining recess 298.

A method of assembling the turbine shroud assembly 22, 222, 322 for use with the gas turbine engine 10 is provided herein. The method includes assembling the first shroud segment 26, 226 by moving the first blade track segment 34, 234 into engagement with the first carrier segment 32, 232 and inserting the first retainer 36 through the first blade track segment 34, 234 and the first carrier segment 32, 232 to couple the first blade track segment 34, 234 to the first carrier segment 32, 232.

The method includes assembling the second shroud segment 28, 228 by moving the second blade track segment 40, 240 into engagement with the second carrier segment 38, 238 and inserting the second retainer 42 through the second blade track segment 40, 240 and the second carrier segment 38, 238 to couple the second blade track segment 40, 240 to the second carrier segment 38, 238. The method includes providing the damping strip seal 30, 230, 330 that includes the body segment 44, 244, 344, a first end portion 46, 246, 346 extending radially outward from a first end 44A of the body segment 44, 244, 344, and a second end portion 48 extending radially outward from a second end 44B of the body segment 44, 244, 344.

The method includes sliding the body segment 44, 244, 344 of the damping strip seal 30, 230, 330 onto the first radial outer surface 90, 290 of the first blade track segment 34, 234 so that the first end portion 46, 246, 346 of the damping strip seal 30, 230, 330 engages the first flange 52, 252 of the first carrier segment 32, 232 and the second end portion 48 of the damping strip seal 30, 230, 330 engages the second flange 54 of the first carrier segment 32, 232.

The method includes moving the second shroud segment 28, 228 toward the first shroud segment 26, 226 so that the second shroud segment 28, 228 is arranged circumferentially adjacent the first shroud segment 26, 226 and the body segment 44, 244, 344 of the damping strip seal 30, 230, 330 extends circumferentially between and axially along the first blade track segment 34, 234 and the second blade track segment 40, 240. The method includes locating the first end portion 46, 246, 346 of the damping strip seal 30, 230, 330 in the first seal-retaining recess 60, 260 formed in the first flange 52 and the third seal-retaining recess 98, 298 formed in the third flange 94, 294 of the second carrier segment 38, 238 and locating the second end portion 48 of the damping strip seal 30, 230, 330 in the second seal-retaining recess 76 formed in the second flange 54 and the fourth seal-retaining recess 89 formed in the fourth flange 96 of the second carrier segment 38, 238.

The method includes urging the body segment 44, 244, 344 of the damping strip seal 30, 230, 330 radially inward against the first blade track segment 34, 234 and the second blade track segment 40, 240 through engagement of the first end portion 46, 246, 346 of the damping strip seal 30, 230, 330 with the first seal-retaining recess 60, 260 and the second end portion 48 of the damping strip seal 30, 230, 330 with the second seal-retaining recess 76.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud assembly for use with a gas turbine engine, the turbine shroud assembly comprising:

a first shroud segment including a first carrier segment arranged circumferentially at least partway around a central axis and a first blade track segment supported by the first carrier segment to define a portion of a gas path of the turbine shroud assembly, the first carrier segment having a first outer wall, a first flange that extends radially inward from the first outer wall, and a second flange axially spaced apart from the first flange and extending radially inward from the first outer wall, a second shroud segment arranged circumferentially adjacent the first shroud segment about the central axis, the second shroud segment including a second carrier segment and a second blade track segment supported by the second carrier segment to define another portion of the gas path of the turbine shroud assembly, the second carrier segment having a second outer wall, a first flange that extends radially inward from the second outer wall, and a second flange axially spaced apart from the first flange of the second carrier segment and extending radially inward from the second outer wall, and a damping strip seal extending circumferentially into the first shroud segment and the second shroud segment to block gases from passing radially between the first shroud segment and the second shroud segment, the damping strip seal having a body segment that extends axially along a first radial outer surface of the first blade track segment and a second radial outer surface of the second blade track segment, a first end portion that extends along a first curvilinear path radially outward and axially aft from a first axial end of the body segment, and a second end portion that extends along a second curvilinear path radially outward and axially forward from a second axial end of the body segment, wherein the first end portion of the damping strip seal engages the first flange of the first carrier segment and the second end portion of the damping strip seal engages the second flange of the first carrier segment to urge the body segment of the damping strip seal radially inward against the first blade track segment and the second blade track segment to dampen flutter movement of the damping strip seal.

2. The turbine shroud assembly of claim 1, wherein the damping strip seal is integrally formed as a single, one-piece component.

3. The turbine shroud assembly of claim 1, wherein the first flange of the first carrier segment is formed to include a first seal-retaining recess that is defined by a first circumferentially-extending face, a second circumferentially-extending face located axially opposite the first circumferentially-extending face, and an axially-extending face that extends between and interconnects the first circumferentially-extending face and the second circumferentially-extending face.

4. The turbine shroud assembly of claim 3, wherein the first flange of the second carrier segment is formed to include a second seal-retaining recess that is defined by a first circumferentially-extending face, a second circumferentially-extending face located axially opposite the first circumferentially-extending face, and an axially-extending face that extends between and interconnects the first circumferentially-extending face and the second circumferentially-extending face, and wherein a first height of the first seal-retaining recess is less than a second height of the second seal-retaining recess and the first end portion of the damping strip seal contacts the axially-extending face of the first seal-retaining recess without contacting the axially-extending face of the second seal-retaining recess.

5. The turbine shroud assembly of claim 3, wherein the first flange of the second carrier segment is formed to include a second seal-retaining recess that is defined by a first circumferentially-extending face, a second circumferentially-extending face located axially opposite the first circumferentially-extending face, and an axially-extending face that extends between and interconnects the first circumferentially-extending face and the second circumferentially-extending face, wherein a first height of the first seal-retaining recess is equal to a second height of the second seal-retaining recess and the first end portion of the damping strip seal contacts the axially-extending face of the first seal-retaining recess without contacting the axially-extending face of the second seal-retaining recess.

6. The turbine shroud assembly of claim 1, wherein the first blade track segment includes a first shroud wall that extends circumferentially partway around the central axis and a first attachment feature that extends radially outward from the first shroud wall, wherein a circumferential end of the first shroud wall is formed with a first recess to define a first shoulder that provides the first radial outer surface of the first blade track segment, the second blade track segment includes a second shroud wall that extends circumferentially partway around the central axis and a second attachment feature that extends radially outward from the second shroud wall, wherein a circumferential end of the second shroud wall is formed with a second recess to define a second shoulder that provides the second radial outer surface of the second blade track segment, and wherein the body segment of the damping strip seal engages the first shoulder and the second shoulder.

7. The turbine shroud assembly of claim 1, wherein the first flange of the first carrier segment includes a first wall and a first protrusion that extends radially inward from the first wall to cover a first axial end of the first blade track segment, the first wall is formed to include a radial inward facing surface and a first seal-retaining recess extends radially outward into the first flange from the radially inward facing surface.

8. The turbine shroud assembly of claim 1, wherein the first carrier segment includes a third flange that extends radially inward from the first outer wall and a fourth flange axially spaced apart from the third flange and extending radially inward from the first outer wall, the third flange is located axially between the first flange and the fourth flange and the fourth flange is located axially between the third flange and the second flange, wherein the first blade track segment includes a first shroud wall that extends circumferentially partway around the central axis, a first attachment flange that extends radially outward from the first shroud wall, and a second attachment flange spaced apart axially aft from the first attachment flange that extends radially outward from the first shroud wall.

9. The turbine shroud assembly of claim 8, wherein the first shroud segment includes a first retainer that extends through the first carrier segment and the first blade track segment so as to couple the first blade track segment to the first carrier segment, and wherein the second flange of the first carrier segment is formed to include a third seal-retaining recess to receive the second end portion of the damping strip seal therein.

10. A turbine shroud assembly for use with a gas turbine engine, the turbine shroud assembly comprising:

a first shroud segment including a first carrier segment arranged circumferentially at least partway around a central axis and a first blade track segment supported by the first carrier segment to define a portion of a gas path of the turbine shroud assembly, the first carrier segment having an outer wall, a first flange that extends radially inward from the outer wall, and a second flange axially spaced apart from the first flange and extending radially inward from the outer wall, a second shroud segment including a second carrier segment arranged circumferentially at least partway around a central axis and a second blade track segment supported by the second carrier segment, and a damping strip seal having a body segment that engages a radial outer surface of the first blade track segment, a first end portion extending radially outward from a first end of the body segment and engaging the first flange, and a second end portion extending radially outward from a second end of the body segment and engaging the second flange to urge the body segment radially inward toward the radial outer surface of the first blade track segment.

11. The turbine shroud assembly of claim 10, wherein the damping strip seal is integrally formed as a single, one-piece component.

12. The turbine shroud assembly of claim 10, wherein the first end portion of the damping strip seal is formed to include a radially-extending portion that extends radially outward from the first end of the body segment and an axially-extending portion that extends axially aft from the radially-extending portion to form a first curvilinear path, and wherein the second end portion of the damping strip seal is formed to include a radially-extending portion that extends radially outward from the second end of the body segment and an axially-extending portion that extends axially forward from the radially-extending portion to form a second curvilinear path.

13. The turbine shroud assembly of claim 12, wherein the first flange is formed to include a first seal-retaining recess that is defined by a first circumferentially-extending face, a second circumferentially-extending face located axially opposite the first circumferentially-extending face, and an axially-extending face that extends between and interconnects the first circumferentially-extending face and the second circumferentially-extending face and the axially-extending portion of the first end portion of the damping strip seal contacts the axially-extending face of the first seal-retaining recess.

14. The turbine shroud assembly of claim 13, wherein the body segment of the damping strip seal has a first width, at least a portion of the first end portion has a second width and the first width of the body segment is greater than the second width of the at least a portion of the first end portion.

15. The turbine shroud assembly of claim 13, wherein the body segment of the damping strip seal has a first width, the first end portion has a second width and the first width of the body segment is substantially similar to the second width of the first end portion.

16. The turbine shroud assembly of claim 10, wherein the first blade track segment includes a shroud wall that extends circumferentially partway around the central axis and an attachment feature that extends radially outward from the shroud wall, wherein a circumferential end of the shroud wall is formed with a recess to define a shoulder that provides the radial outer surface of the first blade track segment, and wherein the body segment of the damping strip seal engages the shoulder.

17. The turbine shroud assembly of claim 10, wherein the first carrier segment includes a third flange that extends radially inward from the outer wall and a fourth flange axially spaced apart from the third flange and extending radially inward from the outer wall, the third flange located axially between the first flange and the fourth flange, and the fourth flange located axially between the third flange and the second flange, wherein the first blade track segment includes a shroud wall that extends circumferentially partway around the central axis, a first attachment flange that extends radially outward from the shroud wall, and a second attachment flange spaced apart axially aft from the first attachment flange that extends radially from the shroud wall, and wherein the first shroud segment further includes a first retainer that extends through the first carrier segment and the first blade track segment so as to couple the first blade track segment to the first carrier segment.

18. A method of assembling a turbine shroud assembly for use with a gas turbine engine comprising:

assembling a first shroud segment by moving a first blade track segment into engagement with a first carrier segment and inserting a first retainer through the first blade track segment and the first carrier segment to couple the first blade track segment to the first carrier segment, assembling a second shroud segment by moving a second blade track segment into engagement with a second carrier segment and inserting a second retainer through the second blade track segment and the second carrier segment to couple the second blade track segment to the second carrier segment, providing a damping strip seal that includes a body segment, a first end portion extending radially outward from a first end of the body segment, and a second end portion extending radially outward from a second end of the body segment, sliding the body segment of the damping strip seal onto a first radial outer surface of the first blade track segment so that the first end portion of the damping strip seal engages a first flange of the first carrier segment and the second end portion of the damping strip seal engages a second flange of the first carrier segment, and moving the second shroud segment toward the first shroud segment so that the second shroud segment is arranged circumferentially adjacent the first shroud segment and the body segment of the damping strip seal extends circumferentially between and axially along the first blade track segment and the second blade track segment.

19. The method of claim 18, further including locating the first end portion of the damping strip seal in a first seal-retaining recess formed in the first flange of the first carrier segment and in a third seal-retaining recess formed in a first flange of the second carrier segment and locating the second end portion of the damping strip seal in a second seal-retaining recess formed in the second flange of the first carrier segment and a fourth seal-retaining recess formed in a second flange of the second carrier segment.

20. The method of claim 19, further comprising urging the body segment of the damping strip seal radially inward against the first blade track segment and the second blade track segment through engagement of the first end portion of the damping strip seal with the first seal-retaining recess and the second end portion of the damping strip seal with the second seal-retaining recess.

* * * * *